US008560275B2

(12) United States Patent
Mustonen et al.

(10) Patent No.: US 8,560,275 B2
(45) Date of Patent: Oct. 15, 2013

(54) METHOD FOR CONTROLLING A PROCESS AND FOR MONITORING THE CONDITION OF PROCESS EQUIPMENT, AND AN AUTOMATION SYSTEM

(75) Inventors: Harri Mustonen, Jyvaskyla (FI); Aki Lehikoinen, Jyvaskyla (FI); Ale Borg, Tampere (FI)

(73) Assignee: Metso Automation Oy, Helsinki (FI)

( * ) Notice: Subject to any disclaimer, the term of this patent is extended or adjusted under 35 U.S.C. 154(b) by 457 days.

(21) Appl. No.: 12/863,215

(22) PCT Filed: Feb. 2, 2009

(86) PCT No.: PCT/FI2009/050085
§ 371 (c)(1),
(2), (4) Date: Jul. 16, 2010

(87) PCT Pub. No.: WO2009/095546
PCT Pub. Date: Aug. 6, 2009

(65) Prior Publication Data
US 2011/0015763 A1    Jan. 20, 2011

(30) Foreign Application Priority Data
Jan. 31, 2008   (FI) ..................................... 20085086

(51) Int. Cl.
G06F 11/00    (2006.01)
H04B 15/00    (2006.01)
(52) U.S. Cl.
USPC ............ 702/188; 702/121; 702/189; 702/190
(58) Field of Classification Search
USPC ................................ 702/121–123, 188–190
See application file for complete search history.

(56) References Cited

U.S. PATENT DOCUMENTS

| 6,260,004 | B1 | 7/2001 | Hays et al. |
|---|---|---|---|
| 2002/0077711 | A1 | 6/2002 | Nixon et al. |
| 2003/0195934 | A1 | 10/2003 | Peterson et al. |
| 2003/0200060 | A1 | 10/2003 | Eryurek et al. |
| 2004/0158713 | A1 | 8/2004 | Aneweer et al. |
| 2005/0072239 | A1 | 4/2005 | Longsdorf et al. |

FOREIGN PATENT DOCUMENTS

| WO | WO 01/42861 A1 | 6/2001 |
|---|---|---|
| WO | WO 2004/012131 A1 | 2/2004 |

OTHER PUBLICATIONS

By Lee, "Smart Transducer Interface Standards for Condition Monitoring and Control for Intelligent Manufacturing" May 23, 2006, XP002534820, pp. 347-371.*
Aug. 31, 2012 European Office Action issued in European Application No. EP 09707087.4.

(Continued)

*Primary Examiner* — Phuong Huynh
(74) *Attorney, Agent, or Firm* — Oliff & Berridge, PLC (57) ABSTRACT

An automation system and a method for controlling a process and for monitoring the condition of process equipment. The method comprises the steps of measuring process signals indicating the condition of the process by means of a first sensor; measuring condition monitoring signals indicating the condition of process components by means of a second sensor; processing the process signals by means of a first I/O module; processing the condition monitoring signals by means of a second I/O module; transmitting the processed process signals obtained from the first I/O module to a process station. The method also comprises the steps of transferring the processed condition monitoring signals obtained from the second I/O module to the same process station; and processing both the said processed process signals and the said processed condition monitoring signals by process station software in the said process station.

38 Claims, 3 Drawing Sheets

(56) References Cited

OTHER PUBLICATIONS

Lee; "Smart Transducer Interface Standards for Condition Monitoring and Control of Machines;" May 23, 2006; pp. 347-371; National Institute of Standards and Technology; Gaithersburg, Maryland, United States.

International Search Report mailed on Jul. 22, 2009 in corresponding International Application No. PCT/FI2009/050085.

Written Opinion mailed on Apr. 28, 2010 in corresponding International Application No. PCT/FI2009/050085.

Nov. 28, 2008 Office Action issued in Finnish Patent Application No. 20085086.

IBM TDB, "Programmable Multispeed Channel", IP.com, PriorArt Database, Technical Disclosure, Feb. 20, 2005, pp. 1-6.

Sigfred Jensen et al., "Total Plant Control: Utilize DCS or PLC", IEEE Cement Industry Conference, May 1992, Dallas Texas, pp. 196-216.

V. Kapsalis, et al., "Seamless Integration of Distributed Real Time Monitoring and Control Applications Utilising Emerging Technologies", IECON'01, The 27$^{th}$ Annual Conference of the IEEE Electronics Society, Industrial Systems Institute, University of Patras, Greece, 2001, pp. 176-181.

* cited by examiner

METHOD FOR CONTROLLING A PROCESS AND FOR MONITORING THE CONDITION OF PROCESS EQUIPMENT, AND AN AUTOMATION SYSTEM

FIELD OF THE INVENTION

The invention relates to a method for controlling a process and for monitoring the condition of process equipment. The invention also relates to an automation system.

BACKGROUND OF THE INVENTION

A condition monitoring system is used for monitoring the condition of process equipment and parts thereof. In the system, signals from objects to be monitored are normally measured by various sensors and, for example, frequency spectra and various indices are computed from them to indicate the condition of the object to be monitored.

Objects to be monitored typically include rotating shafts of various machines, bearings, or other rotating parts, such as cogged wheels of a gearbox, or turbine rotors, as well as various revolving objects in devices. Objects to be monitored also include, for example, rolls, pumps, blowers, screens, grinders, barking drums, mixers, wires, and felts in the manufacturing process of paper and pulp. The objects are typically subjected to friction, which causes wearing and faults that can lead to a breakdown of the machine or the object monitored. For measurements, vibration sensors attached to the object to be monitored are typically used to measure the vibration as acceleration, speed, or offset. Pressure sensors are also used in monitoring pumps, screens and hydraulics for measuring pressure pulsations occurring in a pipework.

Typically, the monitoring is performed by measuring a signal of a given length at regular intervals and by computing the required indices from each measured signal. For example, it is possible to measure a signal of ten seconds once an hour from each object to be monitored. For the values to be computed, certain limit values can be defined for giving an alarm if these limits are exceeded so that a component that is about to fail can be replaced with a new one during the next stoppage before the actual failure in the object to be monitored causes greater damage or extra downtime.

The actual process comprising the objects to be monitored is typically controlled by means of an automation system. In general, a so-called distributed control system (DCS) is used, which typically comprises several process stations, I/O devices and monitoring stations, at least one system bus, programming devices, a database server, and a user interface. The process stations are normally located in the vicinity of the process. The process stations comprise I/O units (input/output), which receive and process measuring signals transmitted by sensors installed for the surveillance of the process. The I/O units can also be placed close to the objects to be measured, apart from the process stations. Communication between the distributed I/O unit and the process station takes place via an I/O bus. The process stations take care of the processing of the measurement data, the computation of the controls and the generating of the controls in situ. Thus, the measurement data are not transmitted to a central computer for computation and returning of the control values.

These two systems described above, the condition monitoring system and the automation system, typically operate independently of each other. Results obtained in the condition monitoring system can be transmitted to the automation system, whereby the automation system can transmit control instructions to the process, for example stop a device in a damage situation.

Figure 1:
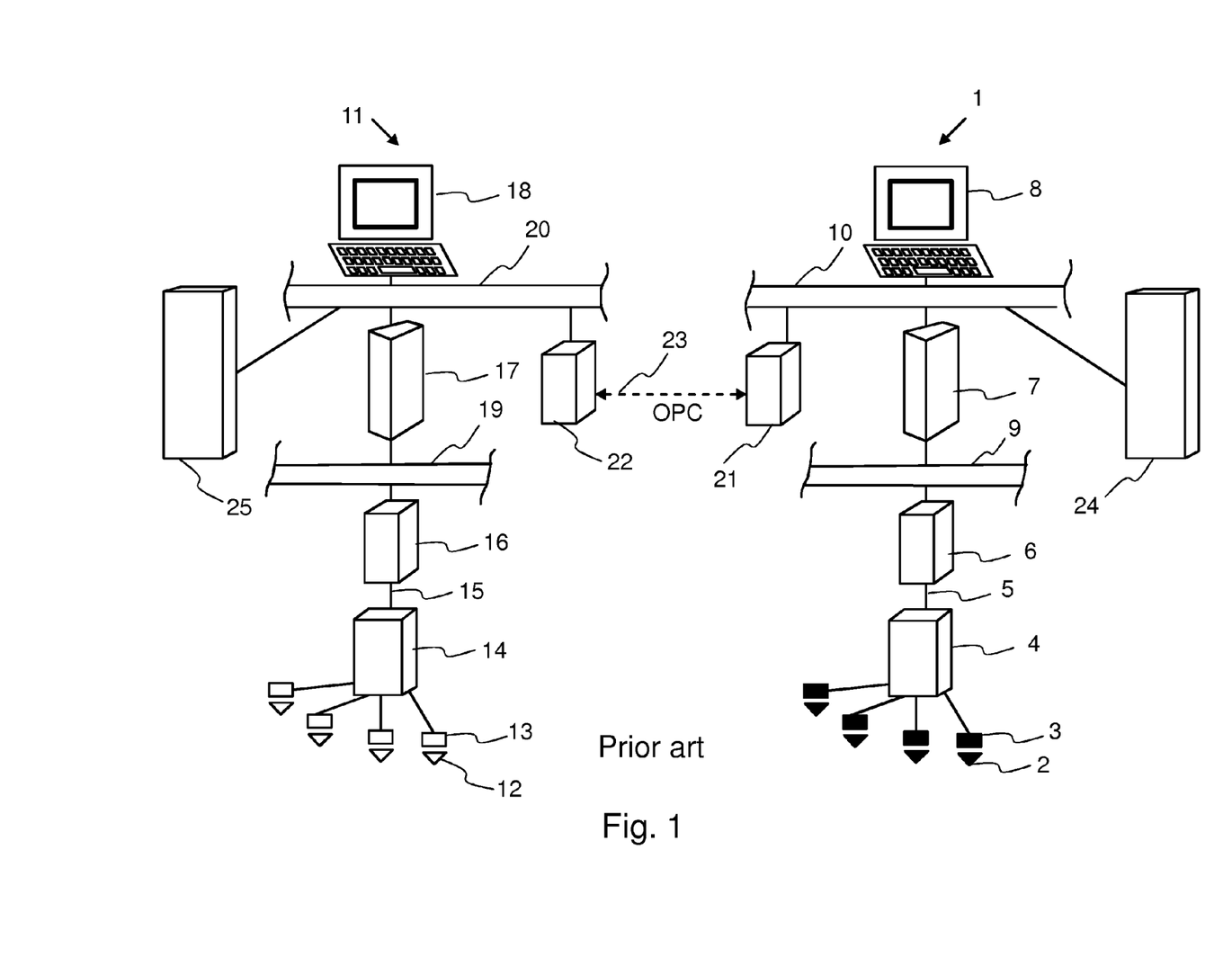
FIG. 1 shows in a schematic and greatly reduced view a condition monitoring and automation system of prior art.

FIG. 1 shows a system of automation and condition monitoring according to prior art. The system comprises an automation system and a condition monitoring system 11, which are independent of each other.

In the automation system 1, at least one sensor 3 is coupled to different components or devices 2 in the process to collect signals indicating the condition of the process, that is, measurement data required for controlling the process. The signals measured from each sensor are led into at least one I/O unit 4 comprising at least one I/O module 33. The I/O module typically contains at least one electronics card and the other components required for forming the I/O (inputs and outputs). The sensors 3 may measure, for example, the pressure or the temperature prevailing in the process or process components 2, the rotational speed of moving parts, the properties of a product to be manufactured, or the flow rate or level of suspensions flowing in the process. For example, in the case of a paper manufacturing process, it is possible to measure, among other things, variables relating to the manufacture and finishing of paper pulp or a paper web. These include, among other things, the variables relating to the beating or digestion of pulp, the variables relating to the running of the paper machine, as well as the variables relating to the quality of paper to be manufactured, such as moisture, grammage, formation, or other properties. The I/O unit 4 receives measurement signals and, among other things, converts the analog signals to digital format. From the I/O unit 4, the signals are transmitted via an I/O bus 5 to a process station 6. The process station 6 comprises process station software, by means of which various indices and functions are computed from the measurement signals. The computation and generation of the controls also takes place in the process station. From the process station 6, the digital signals and/or the computed indices or functions are transmitted in the form of data to be stored in a database server 7. The real-time data obtained from the process station and the history data obtained from the database can be viewed in a user interface 8.

The process station 6 is coupled to a communication bus 9, normally an Ethernet network. If there are more than one process station 6 in the system, they can all be connected to the same communication bus 9. The user interface 8 is coupled to a separate communication bus 10. The database server 7 is coupled to both communication buses 9 and 10, and it communicates with both the process station and the user interface. The communication buses can also be formed by coupling the process station 6, the database server 7, as well as the user interface 8 to one and the same communication bus.

The condition monitoring system 11 also comprises at least one sensor 13 for collecting signals indicating the condition of devices 12. The sensors may be sensors for measuring the acceleration, speed or offset of vibration, or the temperature, the pressure, the flow rate, or the rotational speed. The signals measured from each sensor are led into an I/O unit 14 comprising at least one I/O module. The I/O module typically comprises at least one electronics card and the other components required for forming the I/O. The components forming the I/O module may be arranged within the same housing. The measurement signals transmitted by the sensors installed for the surveillance of the process are processed in the I/O unit. Among other things, the I/O units convert the analog signals into digital format. The analog measurement signal is obtained from the measurement sensor, which is, for example, a piezoelectronic acceleration sensor. However, the measurement signal may also be digital, wherein the I/O module receives a ready sampled condition monitoring signal from the digital sensor and transmits it to the communication bus of the I/O unit. The digital sensors may transmit the signal to the I/O module by means of a cable or wireless data transfer medium. The I/O module may also perform modification of the signal by pre-processing the sampled signal in digital format before transmitting it to the I/O bus. Typical signal modification operations include digital filtering and the conversion of the signal sampling frequency by resampling.

From the I/O unit, the signals are transmitted via an I/O bus 15 to a process station 16 in the condition monitoring system. The process station 16 comprises process station software, by means of which various indices and functions are computed from the measurement signals. Typical operations of digital signal processing include, for example, linear or non-linear scaling, digital filtering, conversion of the signal sampling frequency by resampling, and fast Fourier transform (FFT). From the process station 16, the digital signals and/or the computed indices or functions are transmitted in the form of data to be stored in a database server 17. The real-time data obtained from the process station and the history data obtained from the database can be viewed in a user interface 18. The number of process stations and user interfaces shown in the figure is only one, but there may be several of them, depending on the size of the installation.

Typically, the process station 16 is coupled to a separate communication bus 19, normally an Ethernet network. If the number of process stations 16 in the system is greater than one, they can all be connected to the same communication bus 19. The user interface 18, or user interfaces if the number of user interfaces is greater than one, is/are coupled to a separate communication bus 20. The database server 17 is coupled to both communication buses 19 and 20, and it communicates with both the process station and the user interface. It may also be used as a router between them. Also in the condition monitoring system, the communication buses can be arranged so that the process station 16, the database server 17, as well as the user interface 18 are coupled to one and the same communication bus.

For transmitting the condition monitoring data from the condition monitoring system 11 to the automation system 1, communication servers are connected to both systems, for example OPC servers, which are capable of transmitting data between the systems. The first communication server 21 is connected to the automation system. The second communication server 22 is connected to the condition monitoring system 11. The servers 21 and 22 are connected to each other by means of a wire 23. It is also possible to transmit data between the communication servers 21 and 22 by means of wireless communication. In this case, the servers 21 and 22 comprise means for wireless communication.

Furthermore, both systems comprise separate planning units with tools and software for configuring the systems. The automation system 1 comprises a planning unit 24, and the condition monitoring system 11 comprises a planning unit 25.

As already stated above, the condition monitoring system and the automation system typically operate independently of each other. The reason for this is the fact that the automation system is not capable of operating in the dynamic range required by the condition monitoring system, which prevents the processing of condition monitoring signals directly in the automation system.

As presented above, the I/O means of the automation system consist of I/O modules and I/O buses which transmit signals from the I/O modules to the process station. Measurements are taken continually, at regular intervals. The I/O buses presently used in automation systems are not capable of transmitting large numbers of signals fast forward, but a typical I/O sampling frequency is 50 Hz. This sampling frequency is insufficient for condition monitoring applications.

The condition monitoring system also comprises I/O means consisting of I/O modules and I/O buses. For monitoring the mechanical condition of machines, vibration measurements are typically used, whose signal band ranges, for example, up to 10 kHz. For this reason, the sampling frequency of vibration signals is 2 to 3 decades greater than in the automation system. For example, a signal band of 10 kHz will require a sampling frequency of at least 20 kHz; in other words, the sampling interval is 0.05 ms. Due to the high sampling frequency, the amount of data produced by the I/O modules also increases to a corresponding extent. Conventionally, the I/O buses used in automation systems are not designed to transfer such an amount of data forward, but it has been necessary to process the condition monitoring signals in a separate system.

A problem in the use of separate automation and condition monitoring systems is that these systems do not communicate with each other without separate measures. For communication, a link must be separately built up and configured for transmitting data from one system to the other. The measurement data on vibration signals and/or the computation results based on them can be transmitted, as described above, by means of various communication interfaces from the condition monitoring system to the automation system. Furthermore, a separate communication interface is required between these two systems. The communication interface is, for example, the OPC protocol and the hardware and software components required by it.

The transmission of data between the two systems is slow by applying methods of prior art. It is slow to take measures that require fast, real-time control operations, such as to implement operations for protecting the process and its parts, for example to stop the apparatus in damage situations. Another problem is caused by communication breakdowns between the two systems.

The use of smart field devices has been proposed as a solution to the above-mentioned problems. Such a solution is presented, for example, in US publication 2005/0072239. It presents a vibration monitoring system, in which a smart vibration sensor is installed in an object to be monitored. This means that a transmitter is installed in connection with the vibration sensor, comprising not only software and algorithms relating to the transmission of signals but also software relating to the processing and diagnostics of signals, capable of estimating and anticipating faults to evolve in the object. When the measurements indicate that the object that is measured is becoming faulty, the smart vibration sensor transmits this information to the control means controlling the process. Field buses are used for communication. This solution, too, comprises two separate systems: a smart vibration sensor to take care of the condition monitoring, and a separate automation and control system to take care of the controls of the process. Consequently, the system is subjected to the same problems as were described above. Furthermore, the use of field buses poses a substantial limitation on the quantity of data to be transmitted. For example, a signal sample obtained from a vibration sensor typically contains thousands or tens of thousands of sample points. In practice, the capacity of the bus poses a substantial limit on the possibility to transfer such data quantities to the user interface for a more detailed analysis.

Publication WO 01/42863 discloses a method of prior art for monitoring the condition of process components by utilizing a condition monitoring system and a control system which are independent of each other. In the method, acoustic signals caused by vibrations are measured. The measured signals are led to a signal monitoring block. The process is controlled by a control system that is independent of the condition monitoring and comprises an operation and observation block and a control block. The communication between the signal monitoring block that processes the condition monitoring signals, the operation and observation block and the control block of the control system is guaranteed by OPC protocols. Thus, the operation and control system and the condition monitoring system are separate systems, even though they are installed in the same computer. A separate communication interface with software components is still needed between the different systems.

BRIEF SUMMARY OF THE INVENTION

In the invention, an automation system is provided, which is capable of taking care of the functions required for both the control and regulation of the process and the condition monitoring of the process. Furthermore, an aim is to provide a method for controlling a process and for monitoring the condition of process equipment.

The method for controlling a process and for monitoring the condition of process equipment according to the invention is characterized in what will be presented in the independent claim 1.

The automation system according to the invention, in turn, is primarily characterized in what will be presented in the independent claim 15.

The other, dependent claims will present some preferred embodiments of the invention.

According to the invention, the functionality of the condition monitoring system is built in the automation system. This means that the automation system is provided with such I/O devices, to which measurement sensors for condition monitoring can be directly coupled. Thus, special care is taken of the signal transmission capacity of the I/O devices. Furthermore, the process station software of the automation system is modified so that it is also capable of processing real-time signals from measurement sensors of condition monitoring, together with the control signals, in an integrated manner. Moreover, the functionalities of condition monitoring are also integrated in the user interface and the user interface software of the automation system.

The integration of condition monitoring measurements, especially vibration measurements, in the automation system requires a totally novel type of I/O means, in which the sampling capacity and the signal transmission capacity of the I/O bus are designed to comply with the requirements of vibration measurements. In addition to the I/O rate and the bus capacity, the I/O means can be provided with an electronic connection suitable for vibration sensors, for example the power supply required by most commonly used acceleration sensors, as well as an efficient low-pass filter, to prevent the aliasing of high-frequency signal components to the frequency band under surveillance.

The software of the process station of the automation system is modified in such a way that it is also capable of computing indices and characteristic functions from high-frequency signals from condition monitoring sensors, particularly in view of vibrations. Typically, indices, such as peak and effective values, are computed which indicate the vibration strength of the frequency band defined in the application. Also, results in vector format are computed, such as signal envelope graphs, power spectra, and synchronized time averages (STA), as well as indices which further predict failures of the machine on the basis of these vector-format results.

The condition monitoring components to be added into the user interface of the automation system contain graphics and process images relating to the condition monitoring to be displayed to the operator of the process. The components for maintenance are generated in such a way that they can be displayed on the same physical display device that is also used for process control. The operator of the process may thus change the windows between process control displays and condition monitoring displays, and no separate display devices will be needed for these. Furthermore, the components of condition monitoring may also be included in the same window with the process control.

Furthermore, the components required for the condition monitoring are included in the planning unit of the automation system. Thus, a separate planning unit will not be needed for the condition monitoring.

The necessary modification will be obvious for a person skilled in the art on the basis of this description, and in the modification it is possible to partly apply the principles which are in use in the separate systems of prior art. The more precise operations required for the implementation of the systems will be determined on the basis of the components selected for use.

Since no separate systems are needed for process control and condition monitoring but there is only one automation system with both functions, a number of advantages are achieved:

The reliability of the system is improved, as there is no separate communication interface in the system.

The response times in applications of protection and regulation become shorter, because it is possible to utilize the quick response of the process control system. Thanks to this, the process can be controlled more efficiently and the protective operations are faster.

It is possible to implement real-time applications in which vibration measurements are utilized in control and protection applications.

Information from condition monitoring can be utilized effectively, because it is easily available from the same system as the process control information.

The system is very easy to use and the threshold to use it is low, because the user only needs to manage the operation of a single system.

When new devices to be monitored are added in the installation, its inclusion in the automation system is easier, when both the process control and the condition monitoring system are in the same system and no separate configurations will be needed for independent systems.

The costs are reduced. The number of required devices is reduced, since the I/O devices and software components for both the process control and the condition monitoring can be integrated in the same I/O unit and process station. Furthermore, it is possible to use the same user interface both for controlling the process and for monitoring its condition. In addition, the number of spare parts to kept in reserve is reduced. There is less configuration work for the system, because only one system needs to be configured. Moreover, the configuration is faster and more efficient, which brings savings in the maintenance costs.

BRIEF DESCRIPTION OF THE DRAWINGS

In the following, the invention will be described in more detail with reference to the appended drawings, in which.

DETAILED DESCRIPTION OF THE INVENTION

FIG. 1 has already been discussed above in connection with the description of prior art.

Figure 2:
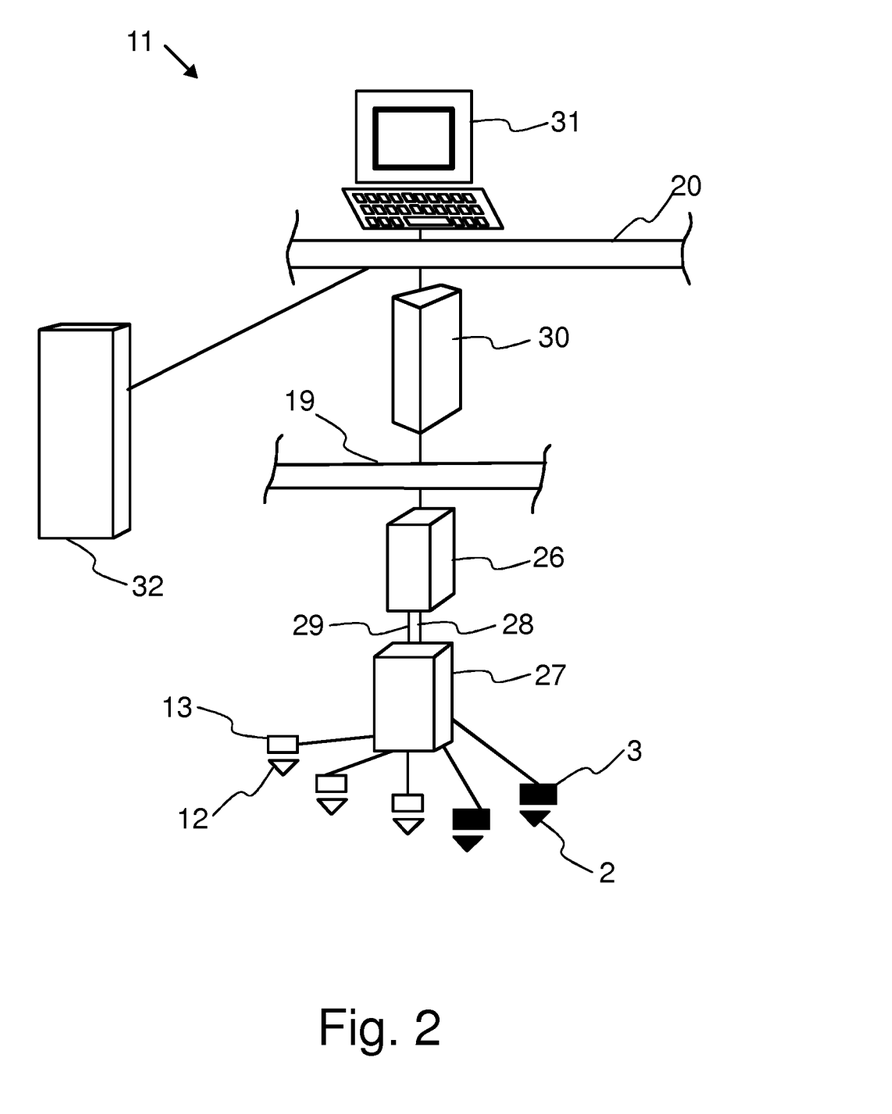
FIG. 2 is a schematic view showing the automation system according to the invention.

FIG. 2 shows an automation system with the built-in functionality of a condition monitoring system. The automation system is a so-called distributed control system that comprises several process stations, I/O devices and other servers, buses and stations; however, only one process station and the components connected to it are shown for the sake of clarity.

Process signals indicating the condition of a process 2 and measured by at least one sensor 3 installed for monitoring and controlling the process, are led into an I/O unit 27. The I/O unit 27 is provided with at least one I/O module 33 shown in FIG. 3 and arranged to process measurement signals with a low sampling frequency. The I/O module typically comprises at least one electronics card and the other components required for forming the I/O. The I/O module 33 is connected to a first I/O bus 28, via which the signals relating to the monitoring of the process are led to the process station 26 of the automation system.

Condition monitoring signals indicating the condition of the devices 12 are measured by means of at least one sensor 13 coupled to at least one device 12. The sensor 13 is, for example, a vibration sensor suitable for the mechanical condition monitoring of devices, measuring the acceleration, speed or offset of the vibration. The measured condition monitoring signals are led into the I/O unit 27. For the condition monitoring signals, the I/O unit 27 is provided with at least one separate I/O module 34, shown in FIG. 3, which is capable of processing signals received at a high sampling frequency. The structure of the I/O module will be described in more detail below in connection with FIG. 3. The I/O module 34 is connected to an I/O bus 29, via which the condition monitoring signals are led to the process station 26 of the automation system.

As noted from the above, both the condition monitoring signals and the signals relating to the surveillance of the process are led into the same I/O unit 27, in which separate I/O modules 33, 34 are provided for receiving and processing the signals. The I/O modules 33, 34 are different in construction; for example, their sampling frequency is different. From the I/O unit 27, both the condition monitoring signals and the signals relating to the surveillance of the process are led via separate I/O buses 28, 29 into the same process station 26 that comprises process station software 40 for processing the signals coming from the first and second I/O modules and for performing the necessary computations. Thus, software elements including the functions of the condition monitoring are added into the software in the process station of the automation system so that it is capable of processing the measurement signals obtained from the condition monitoring, and producing the indices and vector-format graphs required for the maintenance. From the process station 26, the control data and the control signals of the process as well as the condition monitoring data are transmitted to a database server 30 for storage. The real-time data obtained from the process station and the history data obtained from the database can be viewed in a user interface 31.

The user interface 31 consists of at least one display device and one or more input devices. The display device may be a display based on a cathode tube, a flat panel display, an image projected onto a substrate, or a personal, portable display device. The input device may be a conventional keyboard, a mouse, or another data input device known in the field.

The process station 26 is coupled to a communication bus 19, and the user interface 31 is coupled to a separate communication bus 20. The database server 30 is coupled to both communication buses 19 and 20, and it communicates with both the process station and the user interface. The communication buses can also be provided so that the process station 24, the database server 30, as well as the user interface 31 are coupled to one and the same communication bus. In addition, the automation system comprises a planning unit 32, by means of which the history data and alarms relating to both the condition monitoring and the process surveillance are recorded, stored and processed. The planning unit is coupled to the communication bus 20.

Figure 3:
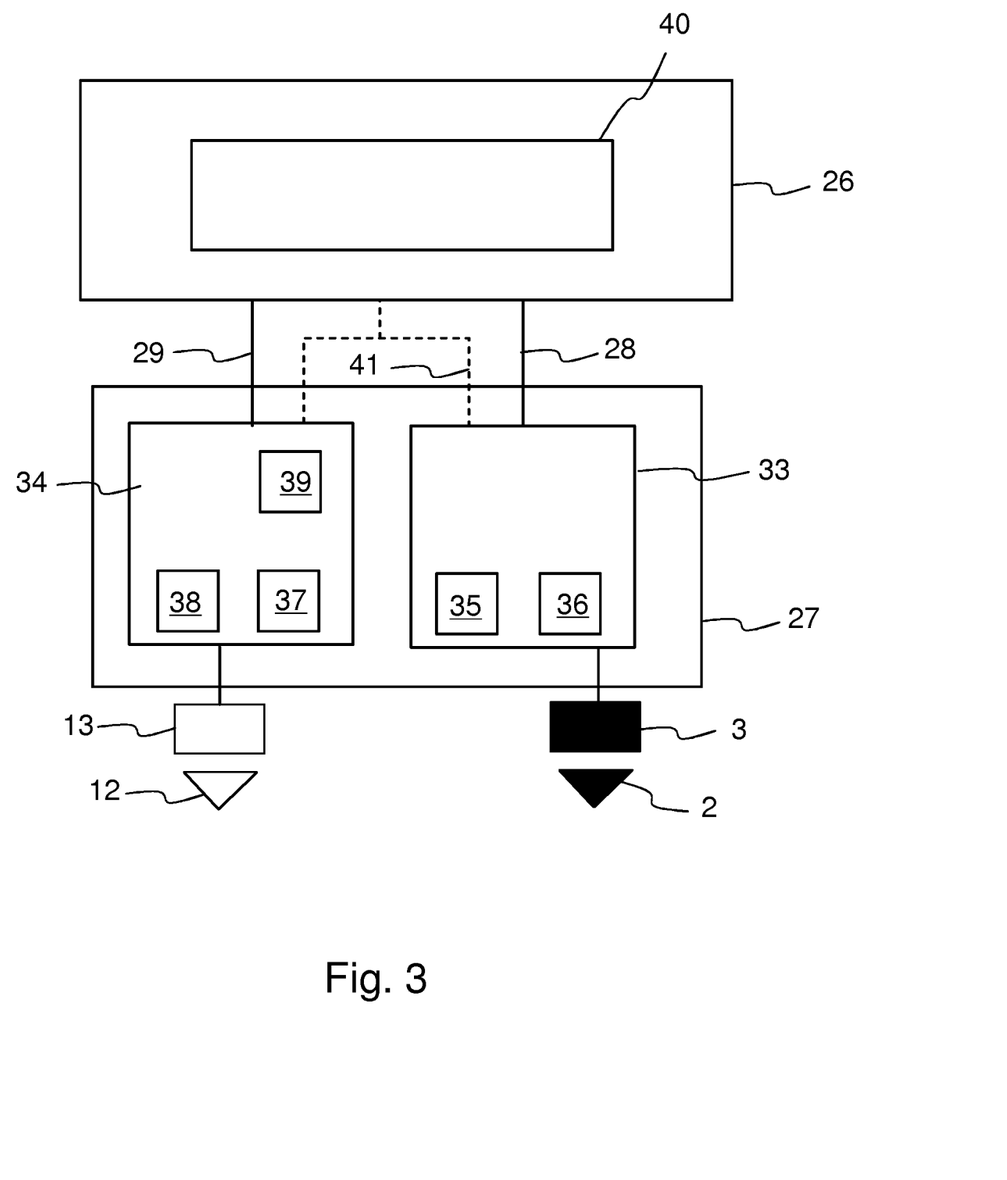
FIG. 3 shows schematically I/O devices of an automation system according to the invention.

FIG. 3 shows, in a greatly reduced view, the structure of the I/O unit 27. At least one I/O module 33 is integrated in the I/O unit 27 for processing the process signals that are received from at least one sensor 3, are related to the monitoring of the process, and indicate the status of the process. The I/O module 33 comprises an A/D converter 35 (analog-to-digital) for converting analog signals to digital signals, as well as other means intended for signal processing. It may comprise, for example, a power supply unit 36 suitable for measuring sensors. The more precise operation of the I/O module 33 is known for a person skilled in the art from an I/O module commonly used in automation systems for receiving measurement data; therefore, the module will not be discussed in more detail in this context.

The I/O unit 27 also comprises at least one I/O module 34 for processing the condition monitoring signals received from at least one sensor 13 and indicating the condition of the components in the process. The I/O module 34 comprises an A/D converter 37 for converting analog signals to digital signals, as well as a low-pass filter 38 to prevent the aliasing of high-frequency signal components to the frequency band under surveillance. The I/O module 34 also comprises a power input unit 39 suitable for measurement sensors. For example, the power input required by acceleration sensors can be provided in the I/O module 34. It is possible to conduct any electrical signals to the I/O module 34. These include condition monitoring signals from different types of sensors, for example vibration sensors, such as sensors measuring the acceleration, offset and speed of vibration, sensors measuring pressure strokes from hydraulic systems and pipeworks, and synchronization sensors of the tachometer type. The I/O module 34 may comprise, for example, one or more eight-channel I/O cards.

The I/O unit 27 also comprises a number of I/O modules other than the above-described I/O modules 33 and 34, whose number may be one or more, depending on the need. The I/O modules can be distributed into one or more I/O units. The I/O unit may also comprise other I/O modules which relate to the other functions of the system, and for the sake of clarity, these are not shown in the figure.

The I/O module 33 is connected to an I/O bus 28, via which the processed process signals are led to the process station 26 of the automation system. The I/O bus 28 is only capable of transmitting a given number of separate signals, either digital or analog signals. It is not capable of transmitting large sets of signals. Thus, the I/O bus 28 suits well for the transmission of signals indicating the condition of the process. The process measurements are taken continually, at regular, relatively long intervals, wherein signals are transmitted continually one by one via the I/O bus 28. The capacity of the I/O bus 28 is designed for sampling frequencies in the range from 1 to 100 Hz. In a corresponding manner, the I/O module 34 is connected to a separate I/O bus 29, via which the processed condition monitoring signals are led to the process station 26 of the automation system. The I/O bus 29 is dimensioned so that its signal transmission capacity is sufficient for the transmission of processed condition monitoring signals coming at a high sampling frequency. The capacity of the I/O bus 29 is designed for sampling frequencies in the range from 5 to 20 kHz. The signal transmission capacity of the I/O bus 28 is lower than that of the I/O bus 29.

The process station 26 comprises process station software 40 capable of dealing with process and condition monitoring signals already processed and coming from both the I/O module 33 and the I/O module 34. Thus, the same process station software processes measurements relating to both the control and the condition monitoring of the process.

The I/O module 33 and the I/O module 34 may also be arranged to transmit process signals and condition monitoring signals already processed via the same I/O bus to the process station 26 of the automation system. Said I/O bus 41 is shown by a broken line in FIG. 3. It is essential that the signal transmission capacity of the I/O bus 41 is sufficiently high.

The above-described automation system is particularly useful in installations in which there is no separate staff specialized in predictive condition monitoring. Operation based on separate condition monitoring and automation systems of prior art requires that the operator knows how to manage both systems. When the functionality of condition monitoring is implemented in the automation system, the surveillance of the condition monitoring data is easier and the threshold to use them is lower. In this way, the surveillance of the condition of the process components is more efficient and a failure in the components can be detected earlier. The parts can be replaced in time, during normal stoppages, and production breakdowns are reduced. Furthermore, only one configuration tool is needed for configuring the system.

Previously, the separate systems have been provided with separate process stations, in which the software of each system (system programs and application programs) has been running. When monitoring has been performed by means of the terminal of the user interface, it has been necessary to change the user interface software when shifting from one system to the other. In the automation system according to the invention, it is possible to use a single process station, where the software takes care of the functionalities of both the condition monitoring and the automation system, and one terminal of the user interface (for example the display of a work station), on which the indices for condition monitoring and automation system, produced by a single user interface software, are visualized.

In the invention, the I/O devices required by the measurements of the condition monitoring are such that the sampling rate and the transmission capacity of the I/O bus are designed especially to meet the demands of the vibration measurements produced by mechanical condition monitoring. The process station software of the automation system is supplemented with software elements to contain the functionalities of the condition monitoring, to process the signals from condition monitoring measurements and to produce the indices and vector-format graphs required by the condition monitoring. Data transmission interfaces between the different systems are also unnecessary, since all the data relating to the condition monitoring is directly available in the automation system in the same way as the data used in the control applications.

The invention is not intended to be limited to the embodiments presented by way of example above, but the invention shall be applied within the scope of the appended claims.

The automation system, which contains the functionality of a condition monitoring system, can also be built in such a way that it does not comprise separate devices for the different functions, but all the functions of the I/O unit, process station, database server and planning unit are installed in the same work station. The functions can also be combined in such a way that, for example, the functions of only two units are combined in the same device, and the other functions are in their respective devices. For example, the I/O modules can also be placed in such a way that one or more I/O modules, including the I/O module 33, are placed in at least one I/O unit, and/or one or more I/O modules, including the I/O module 34, are placed in at least one other I/O unit.

The invention claimed is:

1. A method for controlling a process and for monitoring the condition of process equipment, the method comprising:
   a) measuring process signals indicating the condition of the process by means of a first sensor,
   b) measuring condition monitoring signals indicating the condition of process components by means of a second sensor,
   c) processing the process signals by means of a first I/O module,
   d) processing the condition monitoring signals by means of a second I/O module,
   e) transferring the process signals processed in and obtained from the first I/O module to a process station,
   f) transferring the condition monitoring signals processed in and obtained from the second I/O module to the same said process station,
   g) processing both said processed process signals and said processed condition monitoring signals by process station software in said process station.

2. The method according to claim 1, comprising: generating, based on the processed signals, both process control signals and condition monitoring data in the same said process station software.

3. The method according to claim 1, comprising: performing both the digital signal processing of the condition monitoring signals and the calculation of the process control signals in the same process station software.

4. The method according to claim 1, comprising: transferring the processed process signals via a first I/O bus to the process station, wherein the capacity of the first I/O bus is rated to sampling frequencies in the range from 1 to 100 Hz.

5. The method according to claim 1, comprising: transferring the processed condition monitoring signals via a second I/O bus to the process station, wherein the capacity of the second I/O bus is rated to sampling frequencies in the range from 5 to 20 kHz.

6. The method according to claim 1, comprising: transferring the processed process signals via a I/O bus to the process station, and transferring the processed condition monitoring signals via the same I/O bus to the process station.

7. The method according to claim 1, in which the first I/O module comprises a first electronics card and the second I/O module comprises a second electronics card.

8. The method according to claim 1, comprising: processing condition monitoring signals by means of an A/D converter and a low-pass filter included in the second I/O module.

9. The method according to claim comprising: supplying electric power to the second sensor by means of a power supply unit provided in the second I/O module.

10. The method according to claim 1, comprising: measuring with the first sensor one of the following variables: the pressure or the temperature prevailing in the process or in a process component, the rotational speed of a moving component, a property of a product to be manufactured, the flow of suspensions flowing in the process, or a level.

11. The method according to claim 1, comprising: measuring with the second sensor one of the following variables: the acceleration, offset or speed of vibration.

12. The method according to claim 1, comprising: storing both the process control signals and the condition monitoring data on a database server common to said signals and said data, and transferring both the process control signals and the condition monitoring data by using a data transmission bus common to said signals and said data.

13. The method according to claim 1, comprising: both monitoring and controlling the process, as well as viewing the condition monitoring data by means of a user interface common to said monitoring, said controlling and said viewing.

14. The method according to claim 1, comprising: configuring the system by means of a single planning unit.

15. The method according to claim 1, comprising: transferring the processed process signals via a first I/O bus to the process station, wherein the first I/O bus is configured for signals transmitted continually one by one, and transferring the processed condition monitoring signals via a second I/O bus to the process station, wherein the second I/O bus is configured for signals transmitted at a high sampling frequency.

16. The method according to claim 15, wherein the capacity of the first I/O bus is rated to sampling frequencies in the range from 1 to 100 Hz, and wherein the capacity of the second I/O bus is rated to sampling frequencies in the range from 5 to 20 kHz.

17. The method according to claim 15, comprising: processing the process signals by means of an A/D converter included in the first I/O module, and processing the condition monitoring signals by means of an A/D converter included in the second I/O module.

18. The method according to claim 15, wherein the second sensor is a vibration sensor for measuring the acceleration, offset or speed of vibration.

19. An automation system, comprising:
a first sensor for measuring processing signals indicating the condition of a process,
a second sensor for measuring condition monitoring signals indicating the condition of process components,
a first I/O module for processing the process signals,
a second I/O module for processing the condition monitoring signals,
a process station comprising process station software for processing both the processed process signals and the processed condition monitoring signals, and
at least one I/O bus for transferring the processed process signals from the first I/O module to said process station and for transferring the processed condition monitoring signals from the second I/O module to said process station.

20. An automation system according to claim 19, in which said process station software is further provided for generating, based on the processed signals, both process control signals and process condition monitoring data.

21. The automation system according to claim 19, further comprising:
at least one database server for storing said control signals and said condition monitoring data,
a user interface for both monitoring and controlling the process and for viewing condition monitoring data, and
at least one data transmission bus for transferring said control signals and said condition monitoring data between the process station and the database server as well as said user interface.

22. The automation system according to claim 19, wherein said process station software comprises both the digital signal processing of condition monitoring signals and the calculation of the process control signals.

23. The automation system according to claim 19, further comprising: a first I/O bus for transferring the processed process signals from the first I/O module to the process station, the capacity of the first I/O bus being rated for sampling frequencies.

24. The automation system according to claim 19, further comprising: a second I/O bus for transferring the processed condition monitoring signals from the second I/O module to the process station, the capacity of the second I/O bus being rated for sampling frequencies.

25. The automation system according to claim 19, further comprising: an I/O bus for transferring both the processed process signals and the processed condition monitoring signals via the same I/O bus to the process station.

26. The automation system according to claim 19, wherein the first I/O module comprises a first electronics card and the second I/O module comprises a second electronics card.

27. The automation system according to claim 19, wherein the second I/O module comprises an A/D converter and a low-pass filter for the processing of the condition monitoring signals.

28. The automation system according to claim 19, wherein the second I/O module comprises a power supply unit for supplying electric current to the second sensor.

29. The automation system according to claim 19, wherein the first sensor is arranged to measure one of the following: the pressure or the temperature prevailing in the process or in a process component, the rotational speed of a moving component, a property of a product to be manufactured, the flow of suspensions flowing in the process, or a level.

30. The automation system according to claim 19, wherein the second sensor is a vibration sensor arranged to measure one of the following: the acceleration, offset or speed of vibration.

31. The automation system according to claim 19, further comprising: one planning unit for configuring the system.

32. The automation system according to claim 19, wherein said automation system is a distributed control system.

33. The automation system according to claim 19, further comprising: a first I/O bus for transferring the processed process signals from the first I/O module to the process station, wherein the first I/O bus is configured for signals transmitted continually one by one, and a second I/O bus for transferring the processed condition monitoring signals from the second I/O module to the process station, wherein the second I/O bus is configured for signals transmitted at a high sampling frequency.

34. The automation system according to claim 33, wherein the capacity of the first I/O bus is rated to sampling frequencies in the range from 1 to 100 Hz, and wherein the capacity of the second I/O bus is rated to sampling frequencies in the range from 5 to 20 kHz.

35. The automation system according to claim 33, further comprising: an A/D converter included in the first I/O module for the processing of the process signals, and an A/D converter included in the second I/O module for the processing of the condition monitoring signals.

36. The automation system according to claim 33, wherein the second sensor is a vibration sensor for measuring the acceleration, offset or speed of vibration.

37. The automation system according to claim 23, wherein the capacity of the first I/O bus being rated for sampling frequencies is in the range from 1 to 100 Hz.

38. The automation system according to claim 24, wherein the capacity of the second I/O bus being rated for sampling frequencies is in the range from 5 to 20 kHz.

* * * * *